United States Patent
Saito et al.

[11] Patent Number: 6,023,647
[45] Date of Patent: *Feb. 8, 2000

[54] OUTPUT TORQUE CONTROL SYSTEM FOR INTERNAL COMBUSTION ENGINES FOR VEHICLES

[75] Inventors: Yoshiharu Saito; Kazutomo Sawamura; Shigetaka Kuroda, all of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,487

[22] Filed: Apr. 24, 1997

[30] Foreign Application Priority Data

Apr. 26, 1996 [JP] Japan .................... 8-131413

[51] Int. Cl.⁷ .................... F16H 59/14
[52] U.S. Cl. .................... 701/57; 701/51; 701/55; 477/107
[58] Field of Search .................... 701/51, 55, 95, 701/93, 65, 66, 60, 57; 477/120, 121, 107, 129, 110; 180/197, 170, 179

[56] References Cited

U.S. PATENT DOCUMENTS

| | | | |
|---|---|---|---|
| 5,303,614 | 4/1994 | Sakaki et al. | 74/866 |
| 5,307,270 | 4/1994 | Graf | 364/424.1 |
| 5,323,667 | 6/1994 | Tweed et al. | 477/122 |
| 5,385,516 | 1/1995 | Grange et al. | 477/105 |
| 5,646,842 | 7/1997 | Schulz et al. | 364/424.08 |
| 5,743,826 | 4/1998 | Usuki et al. | 477/98 |
| 5,765,117 | 6/1998 | Horiguchi | 701/51 |

*Primary Examiner*—William A. Cuchlinski, Jr.
*Assistant Examiner*—Arthur D Donnelly
*Attorney, Agent, or Firm*—Armstrong, Westerman, Hattori, McLeland & Naughton

[57] ABSTRACT

An output torque control system for an internal combustion engine for a vehicle is operable during gear shifting of an automatic transmission of the engine, for changing the output torque of the engine so as to reduce a shock caused by the gear shifting. The timing of termination of the changing of the engine output torque is determined, based on a rate of change in the traveling speed of the vehicle. The changing of the engine output torque terminated at the determined timing of termination.

6 Claims, 10 Drawing Sheets

*FIG.1A1*
*PRIOR ART*
VEHICLE SPEED
*FIG.1A2*
*PRIOR ART*
SHIFT POSITION
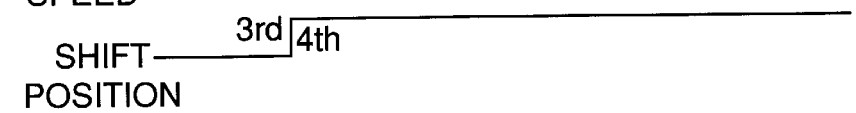
*FIG.1A3*
*PRIOR ART*
ECL
*FIG.1A4*
*PRIOR ART*
TH
*FIG.1A5*
*PRIOR ART*
DRIVING FORCE
*FIG.1B1*
*PRIOR ART*
VEHICLE SPEED
*FIG.1B2*
*PRIOR ART*
SHIFT POSITION
*FIG.1B3*
*PRIOR ART*
ECL
*FIG.1B4*
*PRIOR ART*
TH
*FIG.1B5*
*PRIOR ART*
DRIVING FORCE
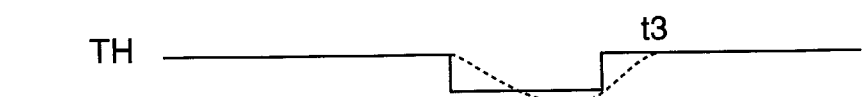

VA

VB

VC

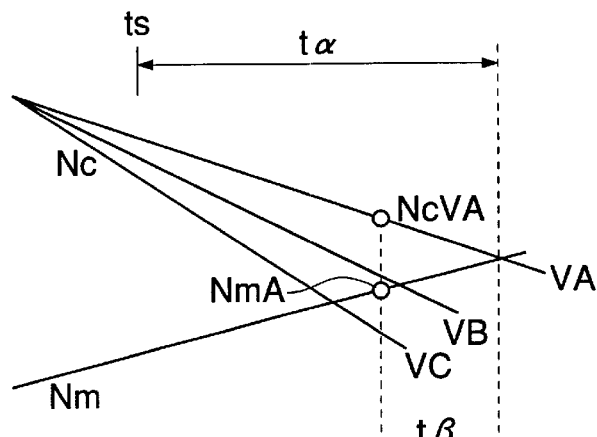
*FIG.10A*
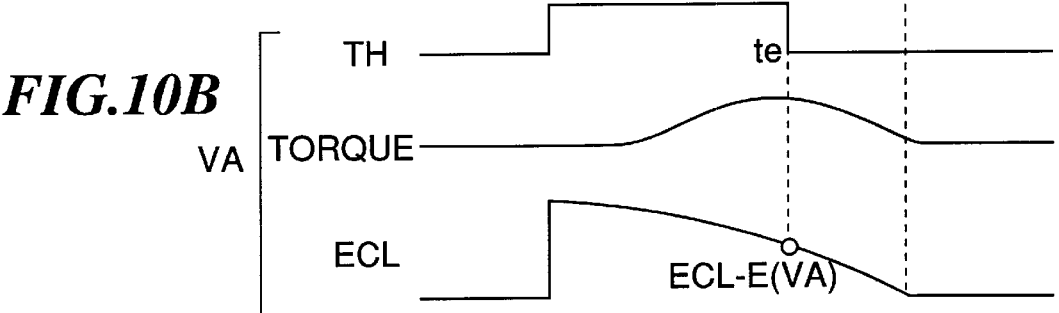
*FIG.10B* VA
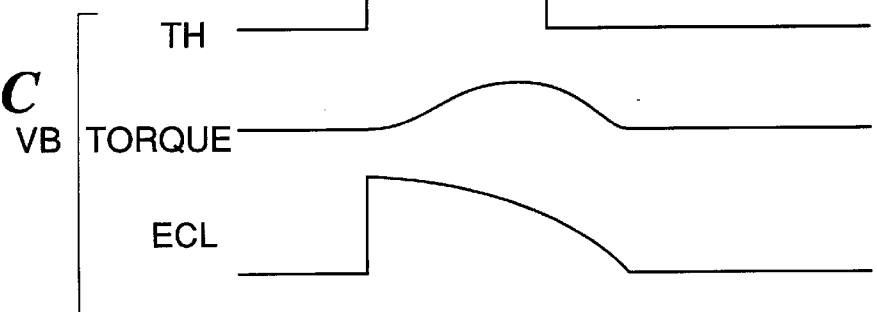
*FIG.10C* VB
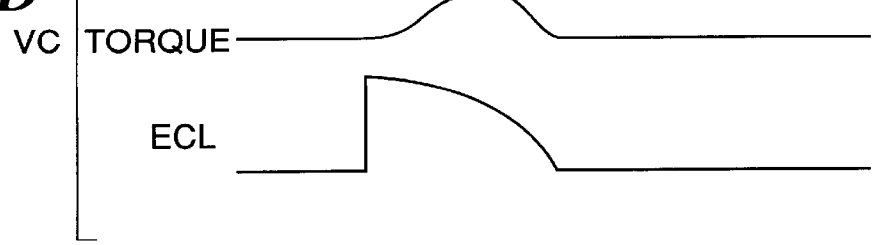
*FIG.10D* VC

OUTPUT TORQUE CONTROL SYSTEM FOR INTERNAL COMBUSTION ENGINES FOR VEHICLES

BACKGROUND OF THE INVENTION

1. Field of the Invention

This invention relates to an output torque control system for internal combustion engines for vehicles, which is capable of reducing a shock generated during gear shifting of an automatic transmission of the engine.

2. Prior Art

Conventionally, an output torque control system for an internal combustion engine for vehicles is known, which reduces output torque from the engine during gear shifting of an automatic transmission of the engine such as an upshift in an inertia phase extending from a time point at which a clutch of the transmission selected before the upshift (lower-speed clutch) starts to be disengaged to a time point at which the upshift is completed, by changing the opening of a throttle valve of the engine, to thereby reduce a shock generated during gear shifting of the automotive transmission. In the known output torque control system, control of reducing the engine output torque is started at the time of start of disengagement of the clutch, and the timing of termination of the engine output torque-reducing control is determined according to a ratio of the rotational speed of an output side (counter shaft) of a gear mechanism of the automatic transmission to the rotational speed of an input side (main shaft) of the same (hereinafter referred to as "input/output rotational speed ratio"), in a manner dependent upon a delay in recovery of the actual engine output torque from a value reduced by the engine output torque-reducing control.

More specifically, according to the known output torque control system, the timing of termination of the engine output torque-reducing control is determined such that a time point which the actual engine output torque recovers a value assumed immediately before the gear shifting coincides with a time point at which the input/output rotational speed if ratio recovers a value assumed immediately before the gear shifting (engage point) after termination of the engine output torque-reducing control. For example, en the timing of termination of the engine output torque-reducing control is set to a time point at which the input/output rotational speed ratio becomes equal to a predetermined fixed value (e.g. 0.8) which is set based on normal traveling conditions of the vehicle. According to this control manner, a smooth change in the actual engine output torque can be obtained after termination of the engine output torque-reducing control to reduce a shock generated upon termination of the gear shifting insofar as the vehicle is traveling under normal traveling conditions.

The known output torque control system, which thus determines the timing of termination of the engine output torque-reducing control, based on the input/output rotational speed ratio alone, however, can provide inconveniences depending upon a manner of change in the traveling speed of the vehicle. For example, in the case where gear shifting is effected when the vehicle speed is changing, such as when the vehicle is climbing or descending a slope or is suddenly braked to be sharply decelerated, the time period required to elapse from the time point of start of gear shifting to the time point at which the input/output rotational speed ratio reaches the engage point differs from that obtained when the vehicle is traveling under normal traveling conditions. This will now be explained with reference to FIGS. 1A and 1B showing cases where an upshift is effected when the vehicle is descending a slope. FIGS. 1A and 1B show changes in the driving force of a vehicle caused by the engine output torque-reducing control during an upshift, in which FIG. 1A shows a case where the vehicle speed is slowly increasing, and FIG. 1B a case where the vehicle speed is sharply increasing (the rate of change in the vehicle speed is large). In the case shown in FIG. 1A, a time point t1 at which the input/output rotational speed ratio reaches the engage point and a time point t3 at which the actual engine output torque recovers a value assumed immediately before the upshift almost coincide with each other, and therefore the driving force gently changes, resulting in only a small shock upon termination of the gear shifting. In contrast, in the case shown in FIG. 1B, while the time point t3 at which the actual engine output torque recovers a value assumed immediately before the upshift is almost the same with that in the case of FIG. 1A, a time point t2 at which the input/output rotational speed ratio reaches the engage point is earlier compared with the time point t1 in FIG. 1A. As a result, the driving force sharply drops after the time point t2, resulting in a large shock.

As noted above, when the vehicle is descending a slope, generally the rate of change (rise) in the vehicle speed is larger than a value assumed under normal traveling conditions of the vehicle, and accordingly the rate of change in the rotational speed of the output side of the automatic transmission relative to that of the rotational speed of the input side becomes large so that the engage point is reached at earlier timing. However, the time period elapsing from the time point of termination of the engine output torque-reducing control to the time point at which the actual engine output torque recovers a value immediately before the gear shifting remains almost constant irrespective of a change in the vehicle speed. Therefore, if the timing of termination of the engine output torque-reducing control is set to the time point at which the input/output rotational speed ratio reaches the predetermined fixed value, the time point at which the actual engine output torque recovers becomes later than the engage point, which results in a shock due to a sudden drop in the driving force caused by the reduced engine output torque.

A similar phenomenon to the above described one can occur also when a downshift is effected when the vehicle is climbing a slope, i.e. the time point at which the actual engine output torque recovers becomes later than the engage point, resulting in a shock upon termination of the downshift.

As explained above, the known output torque control system for internal combustion engines for vehicles has the disadvantage that a large shock can be generated upon termination of gear shifting, depending upon a manner of change in the vehicle speed occurring at the gear shifting.

SUMMARY OF THE INVENTION

It is the object of the invention to provide an output torque control system for internal combustion engines for vehicles, which is capable of adequately reducing a shock generated upon termination of gear shifting of the automatic transmission, irrespective of a manner of change in the traveling speed of the vehicle occurring at the gear shifting.

To attain the above object, the present invention provides an output torque control system for an internal combustion engine for a vehicle, the engine having an automatic transmission, the system comprising:

engine output torque-changing means operable during gear shifting of the automatic transmission, for changing output torque of the engine so as to reduce a shock caused by the gear shifting;

vehicle speed change rate-determining means for determining a rate of change in traveling speed of the vehicle;

termination timing-determining means for determining timing of termination of the changing of the output torque of the engine by the engine output torque-changing means, based on the rate of change in the traveling speed of the vehicle determined by the vehicle speed change rate-determining means; and control-terminating means for terminating the changing of the output torque of the engine by the engine output torque-changing means, at the timing of termination determined by the termination timing-determining means.

Preferably, the termination timing-determining means determines the timing of termination of the changing of the output torque of the engine, based on the change of rate in the traveling speed of the vehicle determined by the vehicle speed change rate-determining means and a response delay of the output torque of the engine to the changing of the output torque of the engine by the engine output torque-changing means.

More specifically, the automatic transmission has an input side and an output side, the termination timing-determining means including first time period-calculating means for calculating a first time period required to elapse from a time point at which the gear shifting of the automatic transmission is started to a time point at which the gear shifting is completed, based on parameters including the rate of change in the traveling speed of the vehicle determined by the vehicle speed change rate-determining means, second time period-calculating means for calculating a second time period required to elapse from a time point at which the changing of the output torque of the engine by the output torque-changing means is terminated to a time point at which the output torque of the engine recovers a value immediately before the gear shifting, and threshold value-calculating means for calculating a predetermined threshold value of a ratio between rotational speed of the input side of the automatic transmission and rotational speed of the output side of same, based on the first and second time periods calculated by the first time period-calculating means and the second time period-calculating means, the control-terminating means terminating the changing of the output torque of the engine by the output torque-changing means when the ratio between the rotational speed of the input side of the automatic transmission and the rotational speed of the output side of same becomes equal to the predetermined threshold value calculated by the threshold value-calculating means.

Further preferably, the first time period-calculating means calculates the first time period, based on the rotational speed of the input side of the automatic transmission, a gradient of the rotational speed of the input side, the rotational speed of the output side of same, a gradient of the rotational speed of the output side, and a gear ratio of the automatic transmission.

Preferably, the gradient of the rotational speed of the output side of the automatic transmission is calculated based on the rate of change in the traveling speed of the vehicle determined by the vehicle speed change rate-determining means.

Preferably, the output torque control system includes engine rotational speed-detecting means for detecting rotational speed of the engine, and engine load-detecting means for detecting load on the engine, and the second time period-calculating means calculates the second time period, based on the rotational speed of the engine and the load on the engine.

Alternatively, the termination timing-determining means determines the timing of termination of the changing of the output torque of the engine, based on the rate of change in the traveling speed of the vehicle determined by the vehicle speed change rate-determining means and the traveling speed of the vehicle.

The above and other objects, features, and advantages of the invention will be more apparent from the following detailed description taken in conjunction with the accompanying drawings.

BRIEF DESCRIPTION OF THE DRAWINGS

FIGS. 1A and 1B show changes in the driving force of a vehicle caused by engine output torque-reducing control during an upshift according to the prior art, in which:

FIG. 1A shows a case where the vehicle speed is slowly increasing: and

FIG. 1B a case where the vehicle speed is sharply increasing (the rate of change in the vehicle speed is large):

FIG. 10 is a timing chart showing the relationship in timing between the rotational speed Nm of the main shaft, the rotational speed Nc of the counter shaft, the engine output torque control, the engine output torque, and the input/output rotational speed ratio ECL during a downshift:

DETAILED DESCRIPTION

The invention will now be described in detail with reference to the drawings showing an embodiment thereof.

Figure 2:
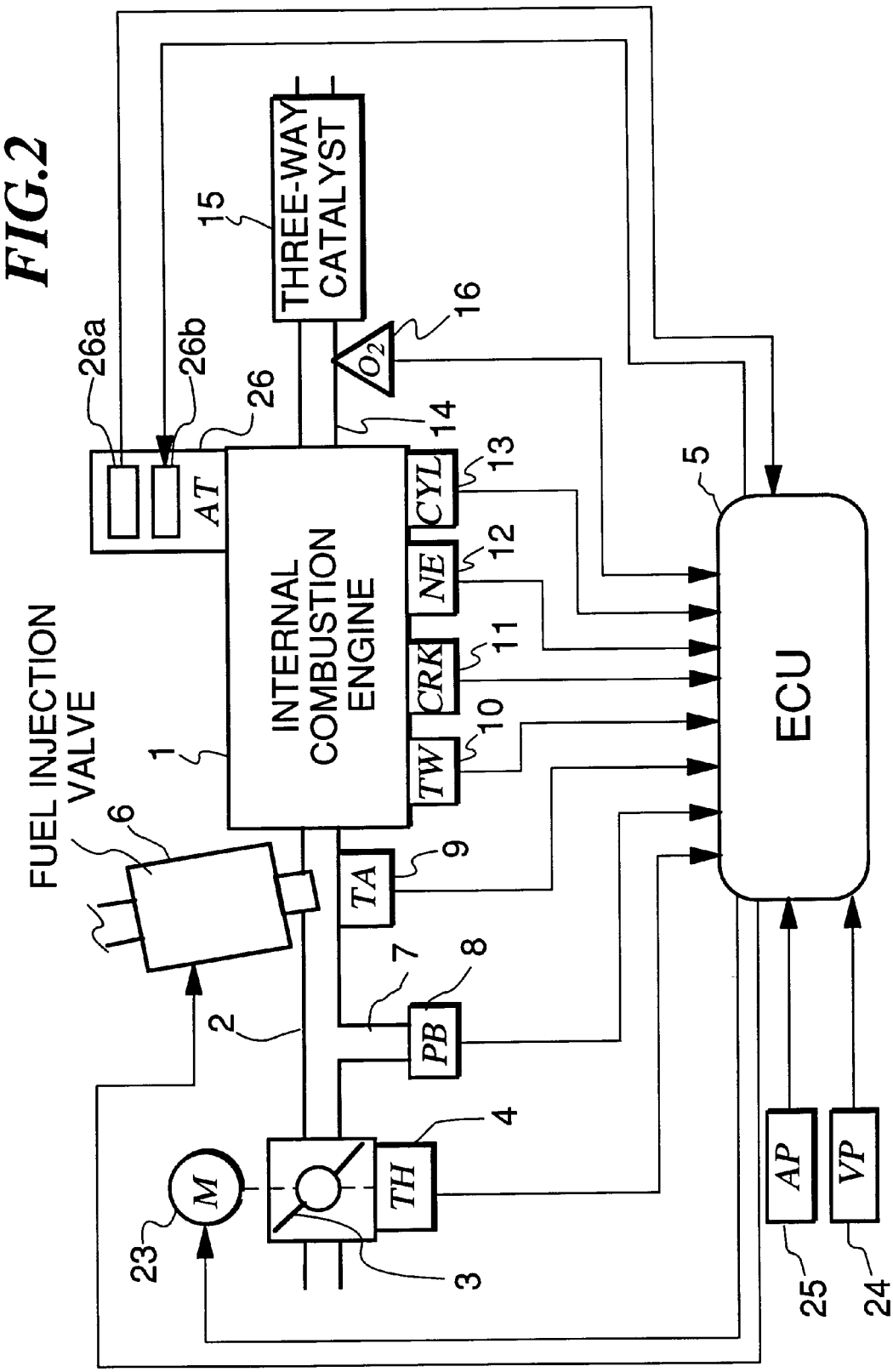
FIG. 2 is a block diagram schematically showing the whole arrangement of an internal combustion engine and an output torque control system therefor, according to an embodiment of the invention.

Referring first to FIG. 2, there is illustrated the whole arrangement of an internal combustion engine (hereinafter simply referred to as "the engine") and an output torque control system therefor, according to an embodiment of the invention.

In the figure, reference numeral 1 designates an internal combustion engine for an automotive vehicle, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 electrically connected to the ECU 5, for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe pressure (PB) sensor 8 is communicated with the interior of the intake pipe 2 via a conduit 7 at a location immediately downstream of the throttle valve 3, for sensing absolute pressure or intake pressure (PB) within the intake pipe 2, and is electrically connected to the ECU 5, for supplying an electric signal indicative of the sensed absolute pressure PB to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

Further connected to the ECU 5 is an automatic transmission 26 which is a conventional type and provided with a hydraulic pressure control circuit 26b for controlling the operations of a lock-up clutch and a gear mechanism of the transmission, neither of which is shown, and a gear position sensor 26a for detecting the shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) of the automotive vehicle in which the engine 1 is installed and supplying a signal indicative of the sensed vehicle speed V to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which supplies driving signals to the fuel injection valves 6, the throttle actuator 23, etc., and also supplies control signals to the hydraulic control circuit 26.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$\text{Tout} = \text{Ti} \times \text{KO2} \times \text{K1} + \text{K2} \tag{1}$$

where Ti represents a basic value of the fuel injection period Tout, which is determined according to the engine rotational speed NE and the intake pipe absolute pressure PBA, by the use of a Ti map, not shown, and stored in the memory means.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Driving signals corresponding to the TOUT values calculated as above are delivered via the output circuit to the fuel injection valves 6 to drive them.

Further, the CPU controls the engaged state of the lock-up clutch, the shift position of the gear mechanism, the valve opening TH of the throttle valve 3 in response to outputs signals from various engine operating parameter sensors.

Figure 3:
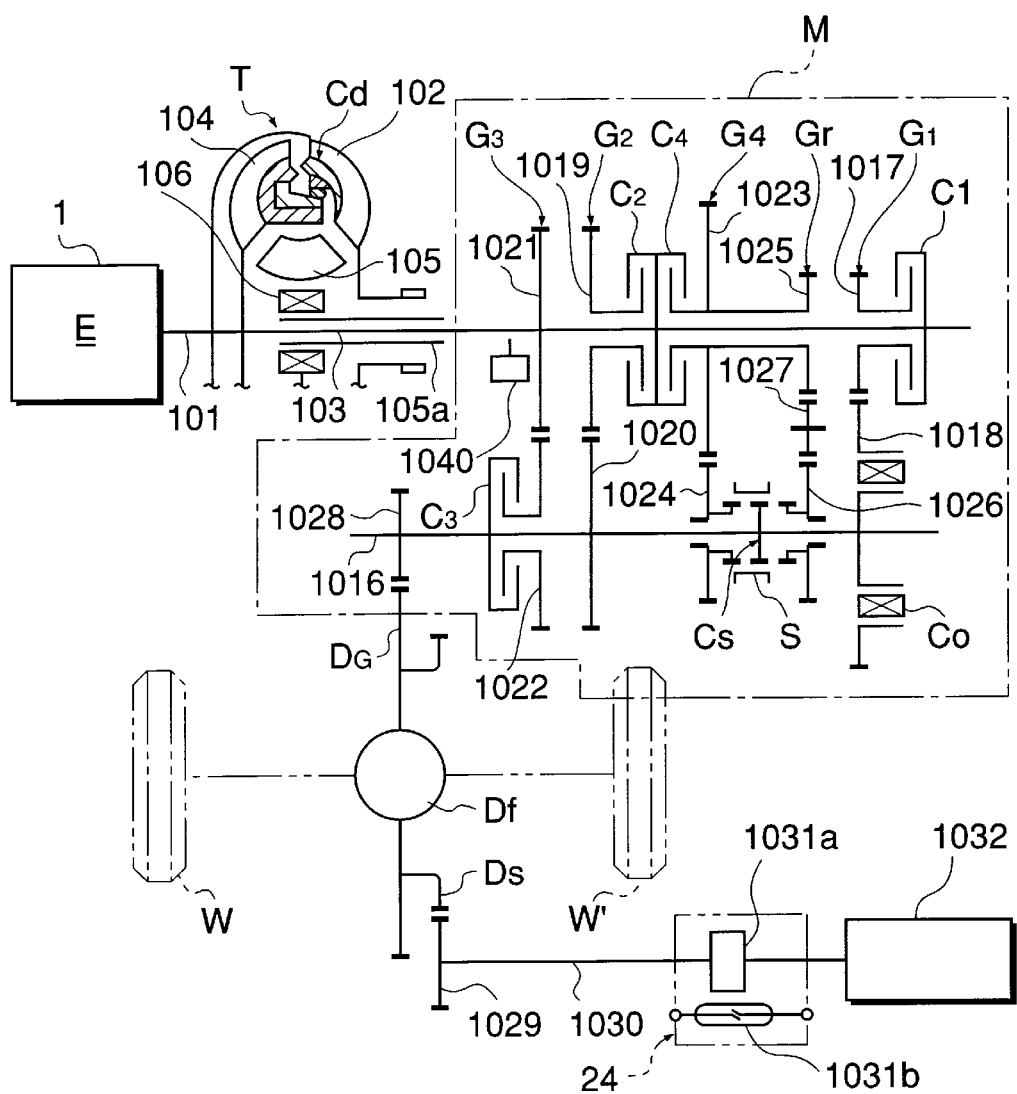
FIG. 3 is a diagram schematically showing the construction of an automatic transmission of the engine in FIG. 2.

FIG. 3 shows the construction of the automatic transmission 26. Output from the engine 1 is transmitted to left and right wheels W and W' of the vehicle through the crankshaft 101 of the engine, a hydraulic torque converter T, an auxiliary transmission M, and a differential Df in the mentioned order.

The hydraulic torque converter T is comprised of a pump 102 coupled to the crankshaft 101, a turbine 104 coupled to an input shaft (main shaft) 103 of the auxiliary transmission M, and a stator 105 coupled, via a one-way clutch 106, to a stator shaft 105a which in turn is supported on the input shaft 103 for rotation relative thereto. Torque is transmitted from the crankshaft 101 to the pump 102, and then to the turbine 104 in a hydrodynamic manner. When amplification of torque takes place while torque is transmitted from the pump 102 to the turbine 104, the resulting reaction force is borne by the stator 105, as is already known.

A lock-up clutch Cd is interposed between the pump 102 and the turbine 104 for mechanically coupling them together.

The auxiliary transmission M has an output shaft (counter shaft) 1016 extending parallel with the input shaft 103, and is provided with a first-speed gear train G1, a second-speed gear train G2, a third-speed gear train G3, a fourth-speed gear train G4, and a reverse gear train Gr, all arranged in juxtaposition between the input and output shafts 103 and 1016. The first-speed gear train G1 is comprised of a driving gear 1017 connectible to the input shaft 103 through a first-speed clutch C1, and a driven gear 1018 connectible to the output shaft 1016 through a one-way clutch C0 and engaging with the driving gear 1017. The second-speed gear train G2 is comprised of a driving gear 1019 connectible to the input shaft 103 through a second-speed clutch C2, and a driven gear 1020 secured to the output shaft 1016 and engaging with the driving gear 1019, while the third-speed gear train G3 is comprised of a driving gear 1021 secured to the input shaft 103, and a driven gear 1022 connectible to the output shaft 1016 through a third-speed clutch C3 and engaging with,the driving gear 1021. The fourth-speed gear train G4 is comprised of a driving gear 1023 connectible to the input shaft 103 through a fourth-speed clutch C4, and a driven gear 1024 connectible to the output shaft 1016 through a selector clutch Cs and engaging with the driving gear 1023. On the other hand, the reverse gear train Gr is comprised of a driving gear 1025 formed integrally with the driving gear 1023 of the fourth-speed gear train G4, a driven gear 1026 connectible to the output shaft 1016 through the selector clutch Cs, and an idle gear 1027 engaging with the gears 1025 and 1026. The selector clutch Cs is arranged between the driven gears 1024 and 1026 of the fourth-speed gear train G4, and has a selector sleeve S which is shiftable between a left or forward position and a right or reverse position as viewed in FIG. 3, to selectively connect the driven gear 1024 or the driven gear 1026 to the output shaft 1016. The one-way clutch C0 permits the driving torque from the engine 1 alone to be transmitted to the driving wheels W, W', while inhibiting transmission of torque from the driving wheels W, W' to the engine 1.

If the first-speed clutch C1 alone is engaged while the selector sleeve S is held in the forward position as illustrated in FIG. 3, the driving gear 1017 is connected to the input shaft 103 to establish the first-speed gear train G1, thereby allowing transmission of torque from the input shaft 103 to the output shaft 1016 therethrough. Then, if the second-speed clutch C2 is engaged with the first-speed clutch C1 maintained in its engaged state, the driving gear 1019 is connected to the input shaft 103 to establish the second-speed gear train G2 through which torque can be transmitted from the input shaft 103 to the output shaft 1016. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed gear clutch C2 is disengaged and the third-speed clutch C3 is engaged instead, the driving gear 1022 is connected to the output shaft 1016 to establish the third-speed gear train G3, while if the third-speed clutch C3 is disengaged and the fourth-speed clutch C4 is engaged instead, the driving gear 1023 is connected to the input shaft 103 to thereby establish the fourth-speed gear train G4. On the other hand, if the fourth-speed clutch C4 alone is engaged while the selector sleeve S of the selector clutch Cs is shifted to the right or reverse position, as viewed in FIG. 3, the driving gear 1025 and the driven gear 1026 are connected, respectively, to the input shaft 103 and the output shaft 1016 to establish the reverse gear train Gr, through which reverse torque is transmitted from the input shaft 103 to the output shaft 1016.

The torque transmitted to the output shaft 1016 is then transmitted through an output gear 1028 mounted on one end of the output shaft 1016 to an enlarged gear DG of the differential Df. A gear Ds is secured to the enlarged gear DG and engaged with a gear 1029, and a speedometer cable 1030 has one end thereof secured to the gear 1029 and the other end to a speedometer 1032 of the vehicle via a magnet 1031a of the vehicle speed sensor 24, respectively. The magnet 1031a is thus driven through the gears Ds and 1029 and the speedometer cable 1030 to indicate the traveling speed of the vehicle, while the vehicle speed sensor 24 is comprised of the aforementioned magnet 1031a, and a reed switch 1031b driven by the magnet 1031a, for instance. Rotation of the magnet 1031a in unison with the speedometer cable 1030 causes alternate closing and opening of the reed switch 1031b, and an on-off signal indicative of closing and opening of the reed switch 1031b is supplied to the ECU 5.

Arranged on the main shaft 103 is a rotational speed sensor 1040 of a magnetic pickup type for detecting the rotational speed Nm of the main shaft 103, an output signal of which is delivered to the ECU 5. An output signal indicative of the rotational speed Nc of the counter shaft 1016 obtained from the speedometer cable 1030 is also delivered to the ECU 5. The input/output rotational speed ratio ECL, i.e. the ratio of the counter shaft rotational speed Nc to the main shaft rotational speed Nm can be expressed as $(NE \times r)/Nm$, where r represents the gear ratio between the main shaft 103 and the counter shaft 1016. The input/output rotational speed ratio ECL assumes 1.0 when there occurs no slip in the selected speed clutch, while it assumes a value less than 1.0 when a slip occurs in the selected speed clutch.

Figure 4:
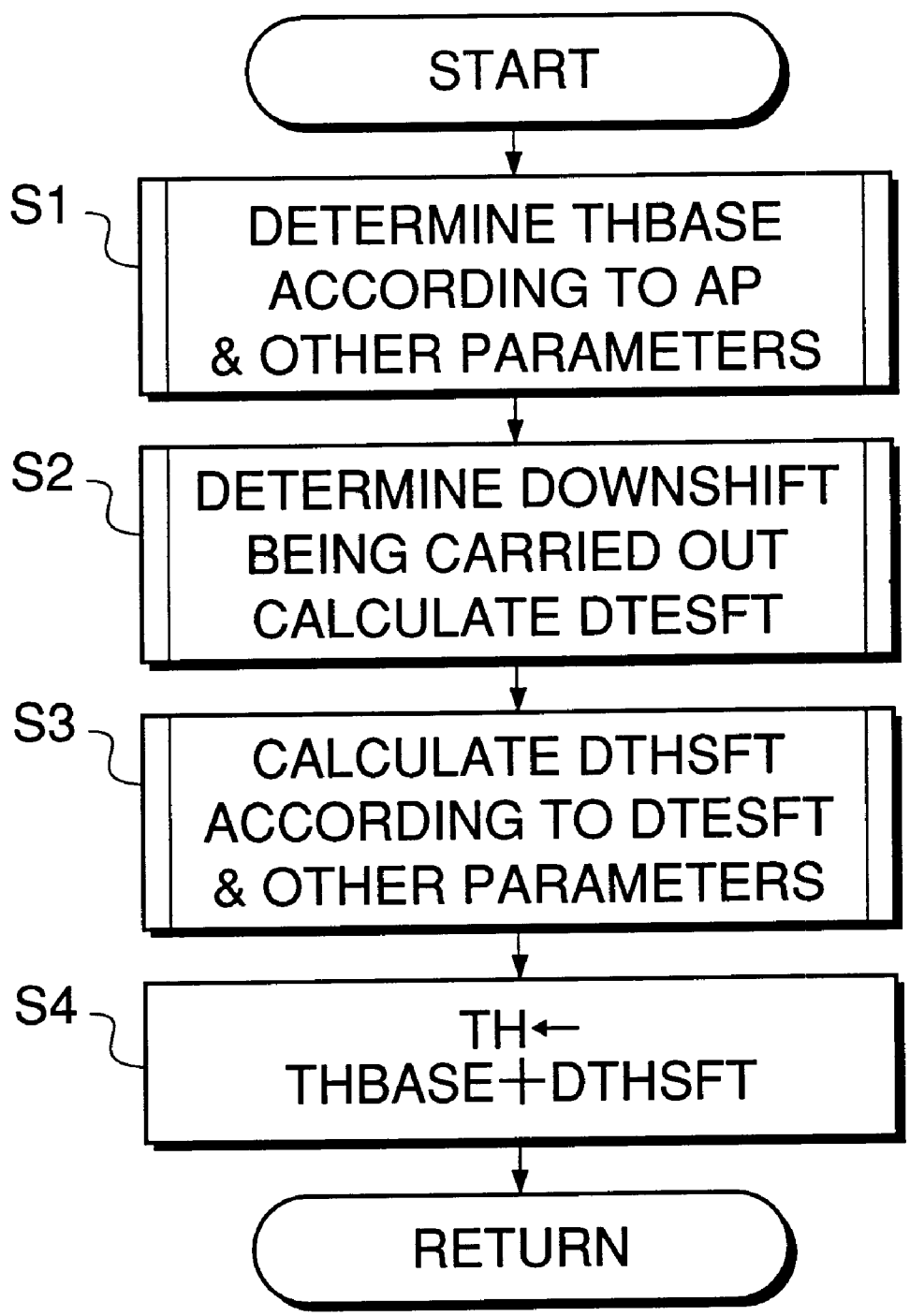
FIG. 4 is a flowchart showing a main routine for controlling the output torque of the engine, which is executed by an ECU appearing in FIG. 2.
Figure 5:
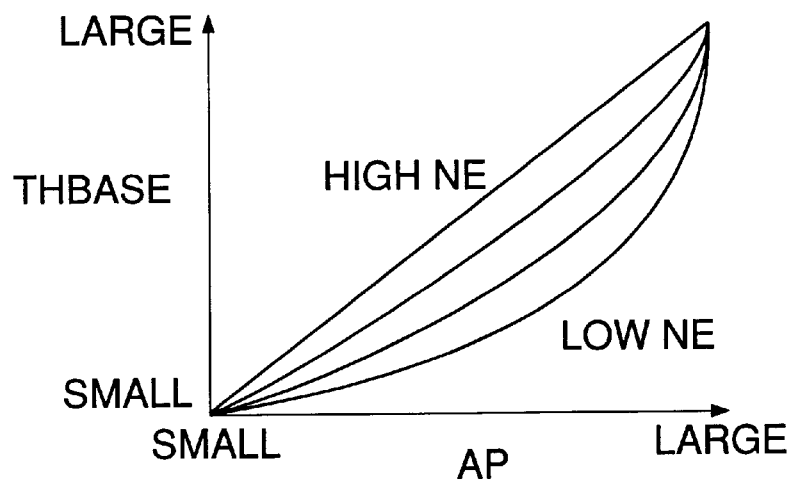
FIG. 5 is a graph showing the relationship between a basic value THBASE of throttle valve opening TH, accelerator pedal position AP, and engine rotational speed NE.

FIG. 4 shows a main routine for carrying out engine output torque control processing, which is executed by the ECU 5. This processing is repeatedly executed at predetermined time intervals set by a timer. First, at a step S1, a basic value THBASE of the throttle valve opening TH is determined according to the accelerator pedal position AP and the engine rotational speed NE. FIG. 5 is a graph showing the relationship between the basic throttle valve opening THBASE, the accelerator pedal position AP, and the engine rotational speed NE.

Figure 6:
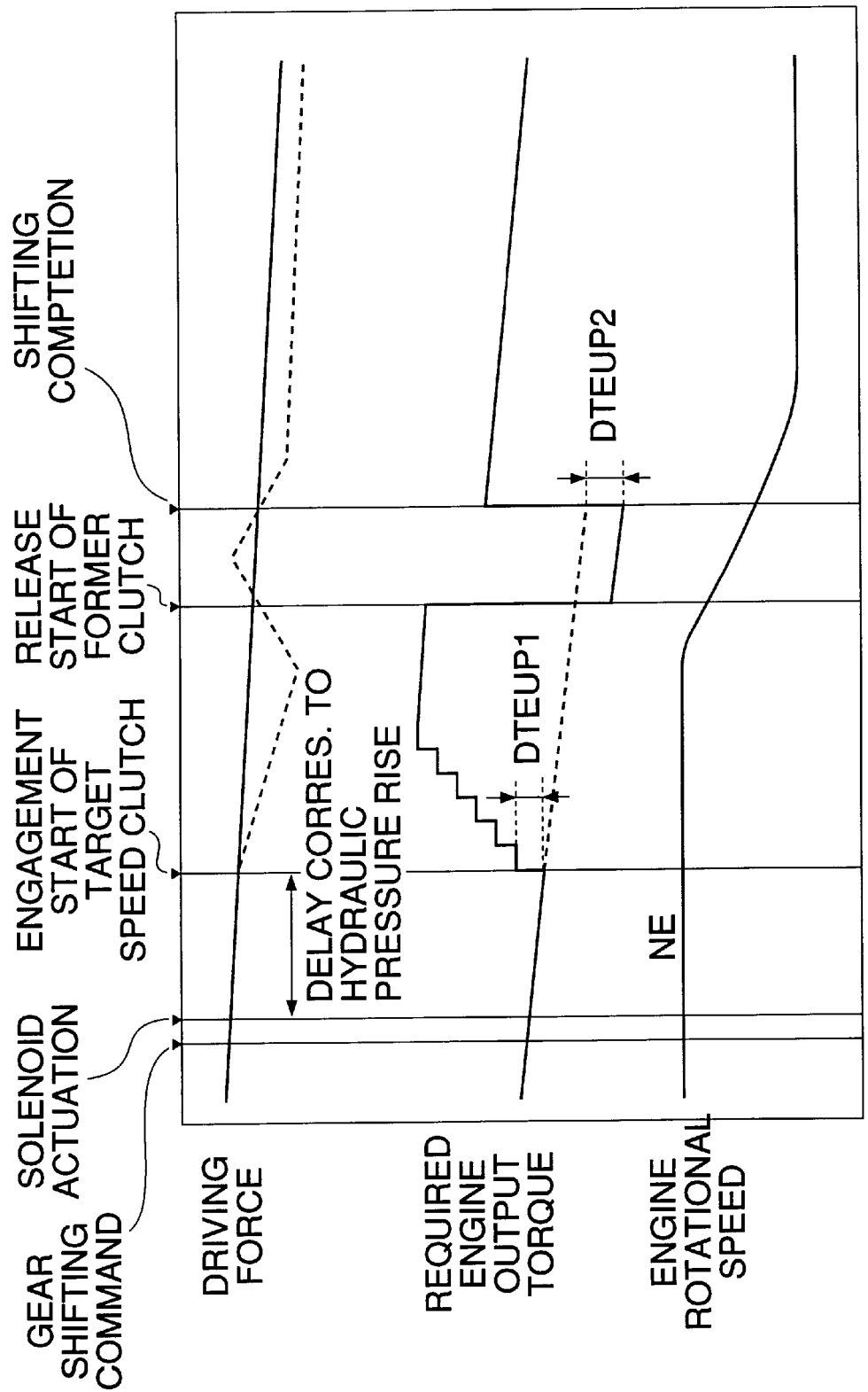
FIG. 6 is a timing chart showing the relationship in timing between the driving force of the vehicle, required engine output torque and the engine rotational speed NE during an upshift.

Then, it is determined at a step S2 whether or not gear shifting of the automatic transmission 26 is being carried out, from outputs from the accelerator pedal position sensor 25 and the gear position sensor 26a. Then, a torque correction amount DTESFT for reducing a shock caused by gear shifting is calculated depending on the result of the determination. When gear shifting is being carried out, the torque correction amount DTESFT is calculated in response to gear-shifting conditions which change every moment according to the speed position SFT, the output torque of the engine (engine rotational speed NE and intake pipe absolute pressure PBA), the change gear ratio of the transmission, the vehicle speed V, etc. The threshold value ECL-E of the input/output rotational speed ratio ECL is calculated based on a rate of change in the vehicle speed V, by a processing, hereinafter described. The timing of calculating the torque correction amount DTESFT will now be described:

FIG. 6 is a timing chart showing the relationship in timing between the driving force of the vehicle, required engine output torque and the engine rotational speed NE during an upshift. In the figure, the broken lines indicate characteristics obtained according to the prior art, for comparison purposes. When a downshifting command is issued and delivered to the hydraulic pressure control circuit 26 from the CPU of the ECU 5, based on the outputs from the accelerator pedal position sensor 25 and the gear position sensor 26a, gear-shifting linear solenoid valves of the gear mechanism are driven based on gear-shifting conditions (third-speed position→second-speed position, fourth-speed position→second-speed position, etc.). However, a delay time exists between the time the linear solenoid valve for the clutch of the target speed position starts to be driven and the time the operating hydraulic pressure actually rises, and therefore execution of the torque correction amount DTESFT-calculation at the step S2 in FIG. 4 is delayed until the operating hydraulic pressure rises. The torque correction amount DTESFT is kept at 0 until the start of the calculation.

When the delay time has elapsed and the target speed position clutch starts to be engaged, the torque correction amount DTESFT-calculation is executed at the step S2. At the step S2, a maximum value of the torque correction amount DTESFT is calculated based on the gear shifting conditions, a number of times of addition to be effected until the calculated maximum value is reached is calculated, and a torque increment DTEUP1 per one time of addition is calculated by dividing the maximum value by the number of times of addition. That is, the engine output torque is increased by adding the torque increment DTEUP1 to a last value of the torque correction amount DTESFT to thereby obtain a present value of DTESFT. When the addition is carried out the number of times of addition, the torque correction amount DTESFT reaches the maximum value. Thereafter, the maximum value of DTESFT is held, i.e. applied, until release of the speed clutch selected before the gear shifting is detected from a change in the engine rotational speed NE.

Then, a torque decrement DTEUP2 is calculated based on the gear shifting conditions detected at the time of detection of the release of the formerly selected clutch, and the torque correction amount DTESFT is set to the calculated torque decrement DTEUP2. Thus, the torque correction amount DTESFT is calculated at the above described timing. That is, it is basically set to a positive value at the start of an upshift which decreases the change gear ratio of the automatic transmission 26, so as to increase the engine output torque. On the other hand, when the upshift is completed, the value DTESFT is set to a negative value so as to decrease the engine output torque, to thereby reduce a shock caused by the upshift. When no gear shifting is effected, the torque correction amount DTESFT is set to 0. When the torque correction amount DTESFT is equal to 0, the throttle valve opening TH is not substantially changed.

Figure 7:
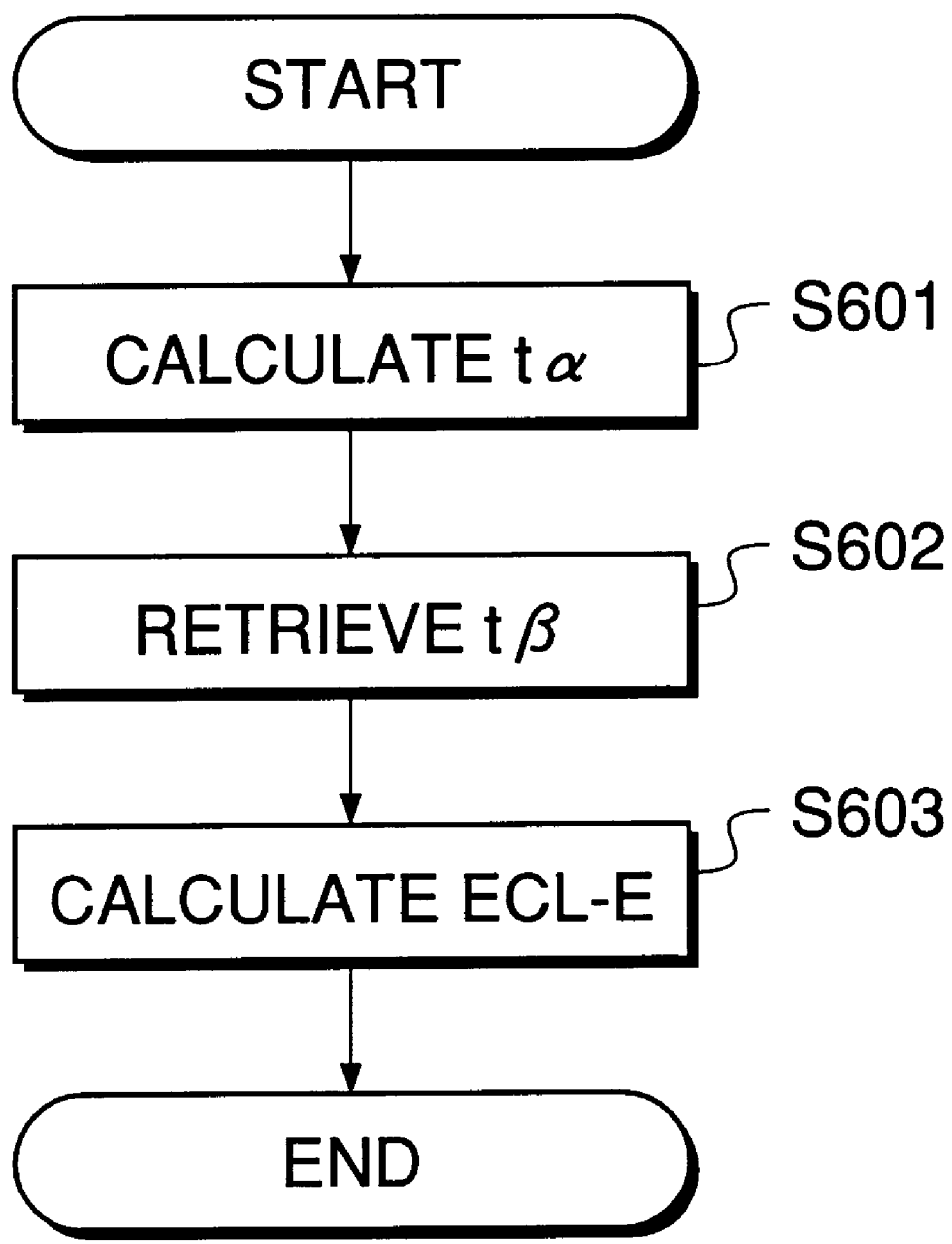
FIG. 7 is a flowchart showing a subroutine for calculating a threshold value ECL-E of the input/output rotational speed of the automatic transmission.
Figure 8A:
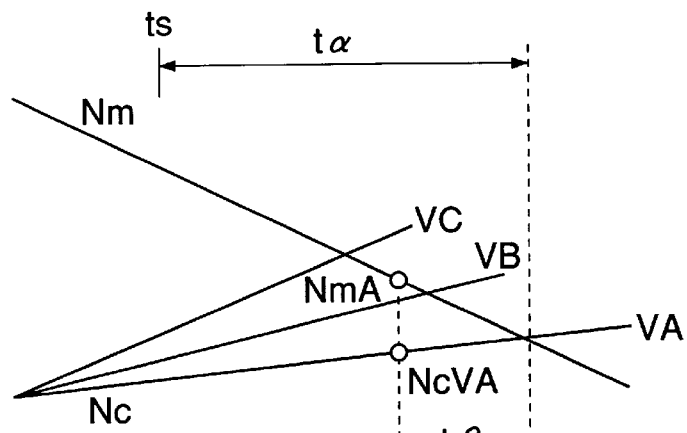
FIG. 8 is a timing chart showing the relationship in timing between the rotational speed Nm of a main shaft of the automatic transmission, the rotational speed Nc of a counter shaft of same, engine output torque control, engine output torque, and the input/output rotational speed ratio ECL during an upshift.
Figure 8B:
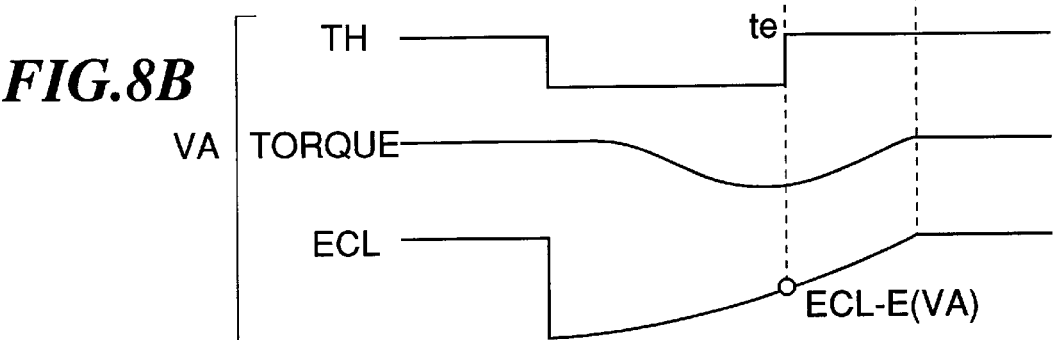
Figure 8C:
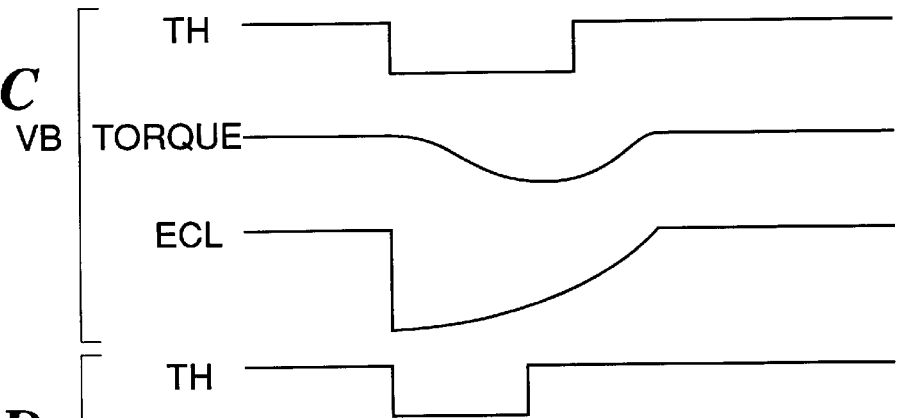
Figure 8D:
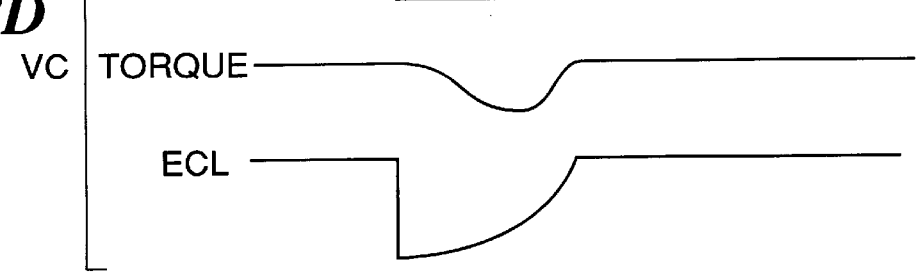

Next, the processing for calculating the threshold value ECL-E will be described:

FIG. 7 shows a subroutine for calculating the threshold value ECL-E. This subroutine is repeatedly executed by the ECU 5 at predetermined time intervals set by a timer.

First, at a step S601, a calculation is made of a time period $t\alpha$ required to elapse from the time the speed clutch selected before the gear shifting becomes released or disengaged to the time the gear shifting is completed (gear shifting time period). Then, at a step S602, a time period $t\beta$ map is retrieved to determine a time period $t\beta$ required to elapse from the time of termination of the engine output torque control to the time the effect of the same control upon the engine output torque becomes zero (i.e. the engine output torque recovers a value assumed immediately before the gear shifting). Based on the obtained time periods $t\alpha$ and $t\beta$, the threshold value ECL-E is calculated at a step S603. The time period $t\beta$ corresponds to a response delay in the engine output torque to the engine output torque control. The threshold value ECL-E is newly calculated whenever gear shifting is effected to establish each new speed gear train. Details of the above steps will be described hereinbelow:

FIG. 8 is a timing chart showing the relationship in timing between the rotational speed Nm of the main shaft, the rotational speed Nc of the counter shaft, the engine output torque control, the engine output torque, and the input/output rotational speed ratio ECL during an upshift. In the figure, three cases are illustrated, in which three respective different values VA, VB and VC of the rate of change in the vehicle speed are assumed during the upshift. Of the three change rate values VA, VB, and VC, VA is the smallest.

As mentioned before, the threshold value ECL-E is a reference value of the input/output rotational speed ratio ECL for determining the timing at which the engine output torque control should be terminated. The threshold values to be selected at the three respective change rate values VA, VB, and VC will be hereinafter referred to as ECL-E(VA), ECL-E(VB), and ECL-E(VC), respectively. For example, the time period $t\alpha$ applied to the case where the change rate value VA is assumed is calculated in the following manner at the step S601:

First, calculations are made of a rate of change in the main shaft rotational speed Nm with the lapse of time (hereinafter referred to as "the gradient Nmt") and a rate of change in the counter shaft rotational speed Nc with the lapse of time (hereinafter referred to as "the gradient Nct"). These gradients are expressed in a unit of rpm/s. The gradient Nmt is determined based on the engine output torque, torque applied to the clutches (clutch torque), and the moment of inertia of the engine, i.e. by the use of an equation of Nmt=(engine output torque−clutch torque)/engine moment of inertia. The gradient Nct is determined based on the rate of change VA in the vehicle speed, i.e. by the use of an equation of Nct=$\Delta V \times (1/3.6) \times (rf/2\pi R) \times 60$, where $\Delta V$ represents the rate of change in the vehicle speed (expressed in a unit of km/h/s), R the radius of vehicle wheels, and rf the final gear ratio.

The main shaft rotational speed Nm and the counter shaft rotational speed Nc assumed at a time point at which a time period tp elapses from a time point ts at which gear shifting is started (time point of start of release of the formerly selected clutch) are determined from respective equations of Nm=Nmt×tp×B1, and Nc=Nct×tp×B2, where B1 represents the rotational speed of the input side or main shaft at the time point ts, and B2 the rotational speed of the output side or counter shaft at the time point ts.

The time period tα is determined with the gear ratio r of the transmission taken into consideration, i.e. from an equation of tα=(B2×r−B1)/(Nmt−Nct×r).

The time period tβ is determined from the time period tβ map at the step S602.

Figure 9:
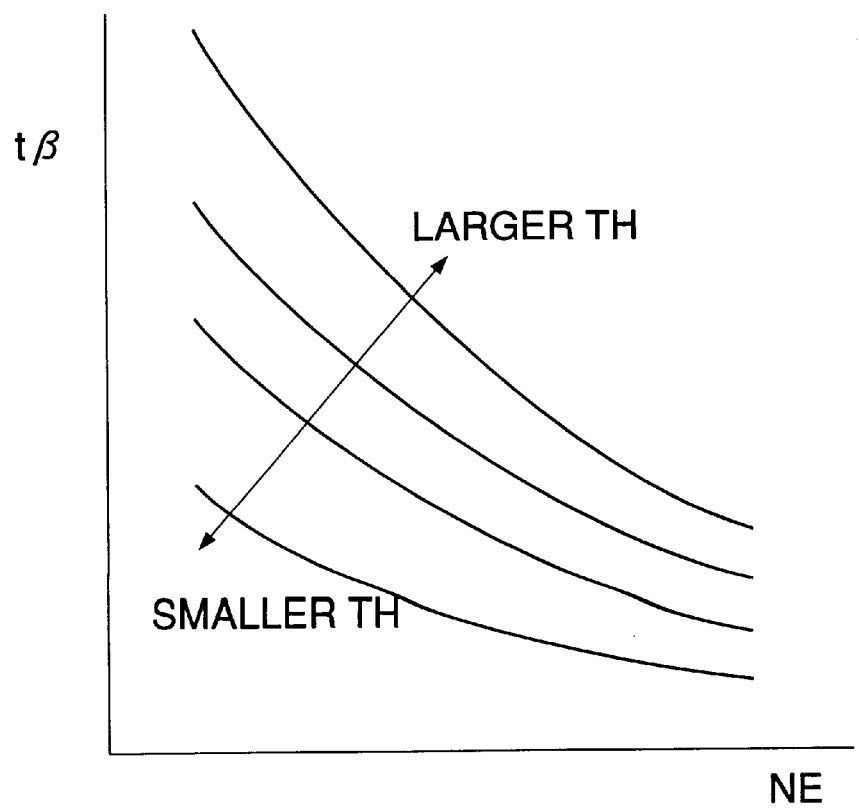
FIG. 9 shows a map for determining a time period $t\beta$.

FIG. 9 shows the time period tβ map. According to this map, the time period tβ is set to a smaller value as the engine rotational speed NE is higher, and set to a larger value as the opening TH of the throttle valve is larger insofar as the engine rotational speed NE remains constant. Instead of using the map, the time period tβ may be set to a fixed value (e.g. 50 ms to 100 ms).

The threshold value ECL-E is determined as follows:

First, from the time periods tα and tβ determined as above, a time point te, shown in FIG. 8, is determined, which is a time point earlier by the time period tβ than the time point of termination of the time period tα. Provided that the main shaft rotational speed and the counter shaft rotational speed assumed at this time point te are represented by NmA and NcVA, respectively, the threshold ECL-E(VA) applied at the change rate value VA can be determined from an equation of ECL-E(VA)=NcVA/NmA. The threshold values ECL-E(VB) and ECL-E(VC) applied at the change rate values VB and VC can be similarly determined. In the case of an upshift, generally the timing of termination of the engine output torque-reducing control is earlier as the change rate in the vehicle speed (acceleration) is larger.

In FIG. 8, in the case of the change rate value VA where the vehicle speed changes most slowly, as the vehicle speed rises after the time point ts at which the formerly selected clutch starts to be disengaged, the counter shaft rotational speed Nc progressively rises, while the main shaft rotational speed Nm progressively decreases, and when the time period tα has elapsed after the time point ts, the two rotational speeds Nc and NM become equal to each other.

The engine output torque-reducing control is carried out e.g. by controlling the throttle valve 3 in the valve closing direction. This control is carried out over a time period from the time point ts to the time point te at which the input/output rotational speed ratio ECL becomes equal to the threshold value ECL-E (VA). After the engine output torque-reducing control is terminated at the time point te, the engine output torque is returned to a value immediately before the gear shifting at a time point at which the time period tβ elapses after the time point te. This returning time point almost coincides with a time point at which the input/output rotational speed ratio ECL returns to 1.0, i.e. the engage point. Thus, it is possible to make the engage point and the recovering time point of the engine output torque coincide with each other without fail, thereby enabling prevention of a sudden change in the engine output torque upon termination of the engine output torque control, i.e. a gear shifting shock.

FIG. 10 is a timing chart showing the relationship in timing between the rotational speed Nm of the main shaft, the rotational speed Nc of the counter shaft, the engine output torque control, the engine output torque, and the input/output rotational speed ratio ECL during a downshift.

In the case of a downshift, the directions of control of the engine output torque and change in the input/output rotational speed ratio ECL are reverse to those in the case of an upshift, but a similar manner of calculating the threshold value ECL-E to that described above can be employed. In the case of a downshift, generally the timing of termination of the engine output torque-reducing control is earlier as the change rate in the vehicle speed (deceleration) is larger.

Figure 11:
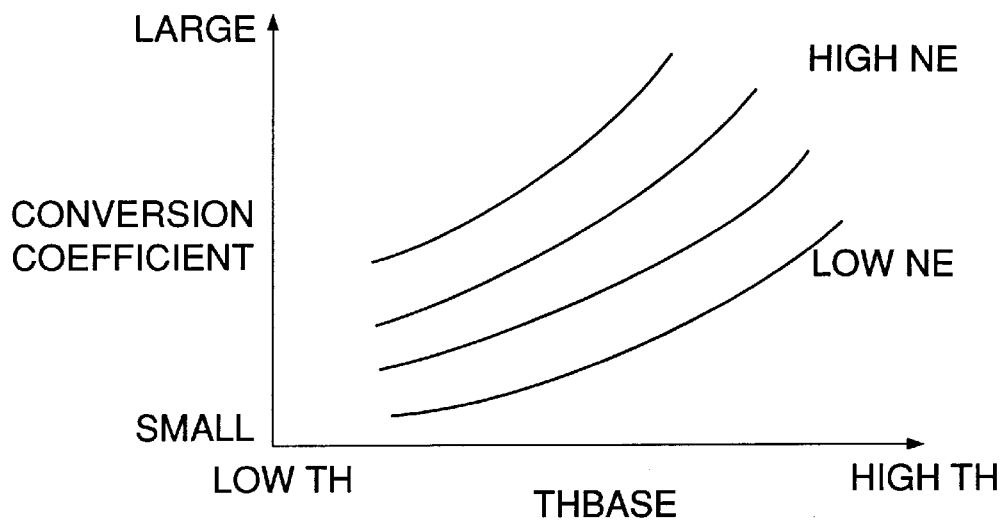
FIG. 11 is a graph showing the relationship between a conversion coefficient, the engine rotational speed NE, and the basic throttle valve opening THBASE.

Referring again to FIG. 4, at a step S3, a throttle valve opening correction amount DTHSFT is calculated based on the torque correction amount DTESFT calculated at the step S2. More specifically, the throttle valve opening correction amount DTHSFT is obtained by multiplying the torque correction amount DTESFT by a conversion coefficient which is retrieved from a map according to the engine rotational speed NE and the basic throttle valve opening THBASE. FIG. 11 shows the map for determining the conversion coefficient. The conversion coefficient is set to a larger value as the engine rotational speed NE is higher and/or the basic throttle valve opening THBASE is larger.

Then, throttle valve control is carried out at a step S4. More specifically, the throttle valve opening TH is set to a value obtained by adding the throttle valve opening correction amount DTHSFT to the basic throttle valve opening THBASE, followed by terminating the present routine. Thus, the throttle valve 3 is driven to the set throttle valve opening TH through the throttle actuator 23.

According to the present embodiment, as described above, when gear shifting is effected, the timing of termination of the engine output torque control is determined based on a rate of change in the vehicle speed, to thereby positively make the time point of recovery of the input/output rotational speed ratio ECL and the time point of recovery of the engine output torque coincide with each other. As a result, a drop in the driving force of the vehicle due to a delay in the response of the engine output torque control can be prevented to thereby reduce a shock caused by such a drop in the driving force. Thus, it is possible to adequately reduce a shock generated upon termination of gear shifting of the automatic transmission, irrespective of a manner of change in the traveling speed of the vehicle occurring at the gear shifting.

The threshold value ECL-E may be calculated by another method, e.g. from a map.

Figure 12:
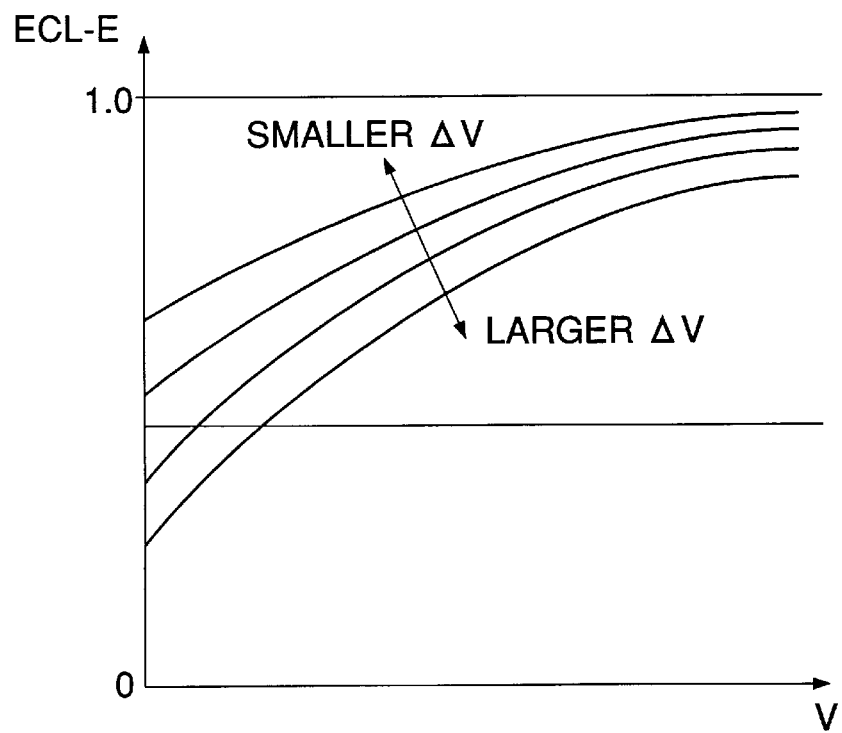
FIG. 12 shows a map for determining the threshold value ECL-E of the input/output rotational speed ratio ECL according to another method.

FIG. 12 shows a map for determining the threshold value ECL-E of the input/output rotational speed ratio ECL according to another method. In the figure, the vehicle speed V is taken along the abscissa, and the threshold value ECL-E along the ordinate. According to this method, as shown in the figure, the threshold value ECL-E is set to a smaller value as the vehicle speed V is lower, and it is set to a smaller value as the rate of change ΔV in the vehicle speed is larger insofar as the vehicle speed V remains constant.

Even by determining the timing of termination of the engine output torque control by using the threshold value ECL-E determined from this map, substantially the same results as those mentioned above can be obtained.

Although in the above described embodiment the engine output torque-reducing control is carried out by regulating the throttle valve opening, this is not limitative. Alternatively, the engine output torque may be controlled by regulating the retard amount of the ignition timing, to achieve substantially the same results. For example, the retard amount of the ignition timing is calculated from the torque correction amount DTESFT, and a basic ignition timing determined based, e.g. on the engine rotational speed NE and the intake pipe pressure PB is retarded by the calculated retard amount to thereby reduce the engine output torque.

What is claimed is:

1. An output torque control system for an internal combustion engine for a vehicle, said engine having an automatic transmission, the system comprising:

engine output torque-changing means operable during gear shifting of said automatic transmission, for changing output torque of said engine so as to reduce a shock caused by said gear shifting;

vehicle speed change rate-determining means for determining a rate of change in traveling speed of said vehicle;

termination timing-determining means for determining timing of termination of said changing of said output torque of said engine by said engine output torque-changing means, based on said rate of change in the traveling speed of said vehicle determined by said vehicle speed change rate-determining means and a response delay of said output torque of said engine to said changing of said output torque of said engine by said engine output torque-changing means; and control-terminating means for terminating said changing of said output torque of said engine by said engine output torque-changing means, at said timing of termination determined by said termination timing-determining means.

2. An output torque control system as claimed in claim 1 wherein said automatic transmission has an input side and an output side, said termination timing-determining means including a first time period-calculating means for calculating a first time period required to elapse from a time point at which the gear shifting of said automatic transmission is started to a time point at which the gear shifting is completed, based on parameters including the rate of change in the traveling speed of said vehicle determined by said vehicle speed change rate-determining means, second time period-calculating means for calculating a second time period required to elapse from a time point at which the changing of the output torque of said engine by said output torque-changing means is terminated to a time point at which the output torque of said engine recovers a value immediately before the gear shifting, and threshold value-calculating means for calculating a predetermined threshold value of a ratio between rotational speed of said input side of said automatic transmission and rotational speed of said output side of same, based on the first and second time periods calculated by said first time period-calculating means and said second time period-calculating means, said control-terminating means terminating the changing of the output torque of said engine by said output torque-changing means when the ratio between the rotational speed of said input side of said automatic transmission and the rotational speed of said output side of same becomes equal to the predetermined threshold value calculated by said threshold value-calculating means.

3. An output torque control system as claimed in claim 2, wherein said first time period-calculating means calculates the first time period, based on the rotational speed of said input side of said automatic transmission, a gradient of the rotational speed of said input side, the rotational speed of said output side of same, a gradient of the rotational speed of said output side, and a gear ratio of said automatic transmission.

4. An output torque control system as claimed in claim 3, wherein said rate of change in said rotational speed of said output side of said automatic transmission with respect to time is calculated based on said rate of change in the traveling speed of said vehicle determined by said vehicle speed change rate-determining means.

5. An output torque control system as claimed in claim 2, including engine rotational speed-detecting means for detecting rotational speed of said engine, and engine load-detecting means for detecting load on said engine, and wherein said second time period-calculating means calculates said second time period, based on said rotational speed of said engine and said load on said engine.

6. An output torque control system as claimed in claim 1, wherein said termination timing-determining means determines said timing of termination of said changing of said output torque of said engine, based on said rate of change in the traveling speed of said vehicle determined by said vehicle speed change rate-determining means and said traveling speed of said vehicle.

* * * * *